S. C. H. HANSEN.
SEWER-TRAPS.

No. 194,676. Patented Aug. 28, 1877.

Attest:
Jnol Brooks.
August Petersohn.

Inventor:
Sophus C. H. Hansen,
pr. Louis Bagger & Co.
attys.

UNITED STATES PATENT OFFICE.

SOPHUS C. H. HANSEN, OF WASHINGTON, DISTRICT OF COLUMBIA.

IMPROVEMENT IN SEWER-TRAPS.

Specification forming part of Letters Patent No. 194,676, dated August 28, 1877; application filed August 11, 1877.

*To all whom it may concern:*

Be it known that I, SOPHUS C. H. HANSEN, of Washington, in the county of Washington and District of Columbia, have invented certain new and useful Improvements in Sewer-Traps; and I do hereby declare that the following is a full, clear, and exact description thereof, which will enable others skilled in the art to which it appertains to make and use the same, reference being had to the accompanying drawings, which form a part of this specification.

My invention relates more particularly to valves or traps for preventing the contents of street-sewers from entering or backing up into the house-conduits; but it may be used with advantage also for other purposes.

It consists, essentially, in the construction and arrangement of the valve-hinge, and in its combination with the pipe or trap inside of which it is placed, substantially as hereinafter more fully explained.

Figure 1:
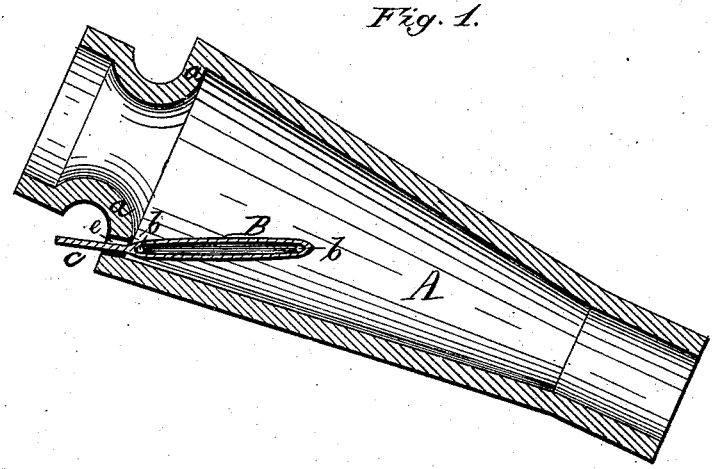
Figure 3:
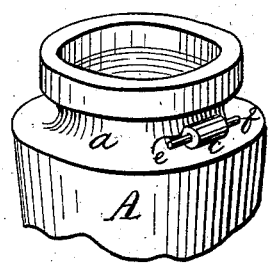
Figure 2:
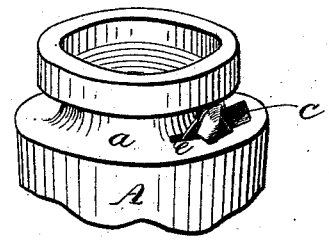
Figure 4:
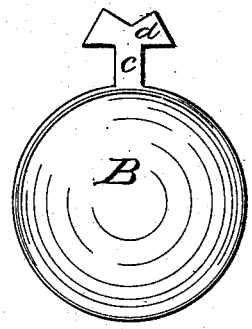

In the drawings, Figure 1 is a longitudinal section of a sewer-trap provided with my improved valve. Figs. 2 and 3 are views of the under side of that portion of the pipe or trap where the hinge penetrates it, showing modifications in the method of securing the hinge, and Fig. 4 is a plan view of the valve detached.

Similar letters of reference indicate corresponding parts in all the figures.

A is the trap-pipe, which may be made of terra-cotta, clay, metal, or any other suitable material. Some distance from one end the pipe slopes outwardly, so as to form a long cone, terminating in an annular shoulder, $a$, which forms an interior flange or valve-seat.

The valve B is, preferably, made of rubber or other elastic or flexible material. It is lens-shaped and hollow inside, as shown in Fig. 1, so as to be readily raised, or lifted by water entering the trap in the direction of the arrow.

If made of rubber or flexible material, a wire, $b$, should be secured around the inside periphery of the valve to insure its perfect circular shape.

$c$ is the valve shank or hinge, which may either be made in one piece with the valve, and of the same material, or separate therefrom. In the drawing I have shown three modifications in the construction of this shank, but they all operate exactly alike, and on the same principle.

In Fig. 1 the flexible shank $c$, which constitutes the hinge, terminates in an enlarged flexible head, $d$, which may be compressed so as to be inserted from the inside through a narrow slot, $e$, in the annular shoulder or valve-seat $a$. After it has been passed through this slot it will expand on the other side, and thus prevent the withdrawal of the valve.

In Fig. 2 I have shown the shank as consisting of a flexible strap, which, after being passed through slot $e$ from the inside, is knotted on the outside, the knot answering the same purpose as the enlarged head, viz., preventing the withdrawal of the valve.

Again, in Fig. 3 the shank consists of a leather or other flexible strap, doubled so as to form a loop, through which a pin, $f$, is inserted, which will prevent the withdrawal of the loop through the slot.

In either case the slot $e$ should be plugged or cemented after the insertion of the shank or hinge-strap, to prevent the water from escaping.

By my method of hinging the valve it cannot possibly get out of order, but is certain to work satisfactorily and easily under all conditions and circumstances. As I dispense entirely with bolts, screws, or other metallic fastening devices, the hinge cannot rust or corrode, but will last as long as the pipe itself.

To insert and properly secure a valve in a trap or pipe is but the work of a moment, and defective valves may be removed and fresh ones reinserted without the least injury to the pipe, if at any time a change of valves should become desirable.

Having thus described my invention, I claim and desire to secure by Letters Patent of the United States—

1. A sewer trap or pipe having a slot or perforation, $e$, for the insertion of a hinge-strap, substantially as and for the purpose hereinbefore set forth.

2. A valve, B, having secured to its periphery a flexible shank or strap with an enlarged head, substantially as and for the purpose hereinbefore set forth.

3. The combination of the valve B, having flexible shank or strap c, with the sewer trap or pipe A, having slot or perforation e, substantially as and for the purpose hereinbefore set forth.

In testimony that I claim the foregoing as my own I have hereto affixed my signature in presence of two witnesses.

SOPHUS C. H. HANSEN.

Witnesses:
  WM. BAGGER,
  JAMES H. MANDEVILLE.